United States Patent
Menzel et al.

[11] Patent Number: 5,275,446
[45] Date of Patent: Jan. 4, 1994

[54] TWIST COUPLING FOR VACUUM PIPES

[75] Inventors: Paul Menzel, Grünendeich, Fed. Rep. of Germany; Tim Thexton, Surrey, Great Britain

[73] Assignee: AGA Aktiebolag, Lidingo, Sweden

[21] Appl. No.: 838,799

[22] PCT Filed: Sep. 4, 1990

[86] PCT No.: PCT/SE90/00565
§ 371 Date: Mar. 18, 1992
§ 102(e) Date: Mar. 18, 1992

[87] PCT Pub. No.: WO91/04436
PCT Pub. Date: Apr. 4, 1991

[30] Foreign Application Priority Data

Sep. 18, 1989 [WO] PCT Int'l Appl. .......... PCT/SE89/00499

[51] Int. Cl.$^5$ .................................. F16L 39/04
[52] U.S. Cl. ........................ 285/134; 285/136; 285/138
[58] Field of Search ............ 285/133.1, 134, 136, 285/138, 904

[56] References Cited

U.S. PATENT DOCUMENTS

| | | | |
|---|---|---|---|
| 3,684,316 | 8/1972 | Lavender | 285/134 |
| 4,106,796 | 8/1978 | Asztalos et al. | 285/133 R |
| 4,606,560 | 8/1986 | McCracken | 285/134 |
| 4,792,164 | 12/1988 | Suemitsu | 285/134 |
| 5,044,673 | 9/1991 | Jones, Jr. | 285/134 |
| 5,110,162 | 5/1992 | Peter et al. | 285/134 |

FOREIGN PATENT DOCUMENTS

| | | | |
|---|---|---|---|
| 493196 | 5/1950 | Belgium | 285/134 |
| 3322405 | 1/1985 | Fed. Rep. of Germany . | |
| 1592026 | 6/1970 | France . | |
| 1389353 | 4/1975 | United Kingdom . | |

*Primary Examiner*—Eric K. Nicholson
*Attorney, Agent, or Firm*—Pollock, Vande Sande & Priddy

[57] ABSTRACT

A device is adapted for coupling together two vacuum lines, such that when coupled the lines can be rotated relative to each other. Each of the vacuum lines includes two mutually concentric pipes which define a vacuum space therebetween. The coupling device includes a first coupling part, a male part, on the one vacuum line, and a second coupling part, a female part, on the other vacuum line. Located between the male part and the female part is at least one sealing ring which is arranged so as not to come into direct contact with a cold or a hot medium flowing through the inner pipe. The invention also relates to male and female parts of the coupling device for coupling together vacuum lines which, subsequent to being coupled, can be rotated relative to each other.

20 Claims, 2 Drawing Sheets

TWIST COUPLING FOR VACUUM PIPES

FIELD OF THE INVENTION

The present invention relates to a device for coupling together two vacuum lines, so that when coupled together, the lines can be rotated relative to one another, each of the vacuum lines including two mutually concentrical pipes (1, 2) which form therebetween a vacuum space (3) and the inner pipe (2) forming a fluid transport channel. The invention also relates to a first and a second coupling part of a first and a second vacuum lines respectively forming part of the coupling device.

BACKGROUND OF THE INVENTION

Vacuum lines of the above kind are used, among other things, to convey cryogenic liquids, the vacuum prevailing between the inner transport pipe and the surrounding outer pipe forming an effective insulation. Such vacuum line arrangements may, of course, also be used beneficially for the transportation of hot media.

Difficulties are experienced in the case of some applications in which two sections of such a vacuum line are to be coupled together in a manner which will enable the sections to be rotated relative to each other, for instance when the vacuum line is to be used for the transportation of a coolant, for example liquid nitrogen, to movable equipment, these difficulties being particularly applicant when the application concerned requires frequent rotation between the line sections. One problem in this respect resides in the fact that the requisite elastic sealing rings are unable to withstand the low or high temperatures concerned. Normally, a sealing ring made of some suitable material, for instance a rubber composition, cannot be subjected to temperatures below 40° C. and remain effective. This temperature shall be compared with the temperature of liquid nitrogen, that is $-196°$ C., which one is often desirous of using for cooling (chilling) purposes among others.

SUMMARY OF THE INVENTION

The main object of the present invention is to provide a solution to the above problem, such that two vacuum lines can be mutually coupled in a manner which will enable the vacuum lines to be rotated relative to each other, with the aid of elastic sealing rings, for example, O-rings, without the sealing rings being subjected to excessively low or excessively high temperatures, even when transporting very cold or very hot media, respectively.

This object is achieved in accordance with the present invention by configuring the parts that form the coupling device in a manner such that the sealing rings will not come into direct contact with the cold or the hot medium and by providing a wall which encloses the medium or with a wall which has become cold or hot respectively by thermal conduction from material in direct contact with the medium.

The present invention is directed to an inventive device intended for coupling together two vacuum lines so that, when coupled, the lines can be rotated relative to each other; to a first coupling part of a vacuum line which is intended to be coupled to a second coupling part of a second vacuum line; and to a second coupling part of a vacuum line intended to be coupled to the first coupling part of the first vacuum line.

The invention will now be described in more detail with reference to the preferred embodiments illustrated in the accompanying drawings, wherein:

BRIEF DESCRIPTION OF THE DRAWINGS

In FIG. 1, the reference numeral identifies the outer pipe and the numeral 2 identifies the inner pipe of a vacuum line. The pipe 2 is intended for the transportation of fluid, for example a cryogenic liquid, such as liquid nitrogen having a temperature of $-196°$ C. The space 3 formed between the pipes 1 and 2 is sealed hermetically at the ends of respective line sections and is under an insulating vacuum in the order of $10^{-6}$ mbars. This vacuum space results in the minimum of heat transfer between the pipe 1 and the pipe 2.

Figure 1:
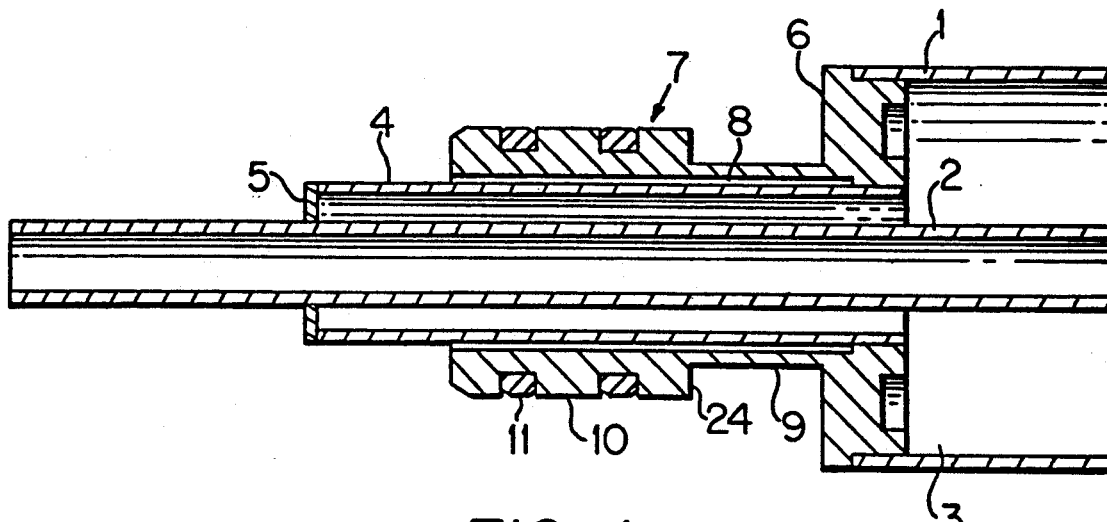
FIG. 1 is a sectional view of an inventive first coupling part of a vacuum line.

In the case of the coupling part illustrated in FIG. 1, this coupling part hereinafter being referred to as the male part, the inner pipe 2 extends beyond the end of the outer pipe 1. Part of the outwardly projecting portion of the inner pipe 2 is surrounded by a first, sleeve-like thin-wall element 4, the front end of which is connected to the outer surface of the inner pipe 2 by means of a first end-wall 5 in a manner to obtain a vacuum seal. The rear end of the sleeve 4 is connected to the outer pipe 1 by means of a second end-wall 6, also in a manner to obtain a vacuum seal. A first annular member 7 extends from the end-wall 6 in a direction towards the first end-wall 5, such as to form a narrow gap 8 between the inner surface of the annular member 7 and the outer surface of the sleeve 4, this gap extending from the end-wall 6 and terminating at the front end of the member 7. This annular member 7 has a rear part 9 of smaller outer diameter than the front part 10 of the member 7. An engagement shoulder 24 is formed between the parts 9 and 10. Formed in the part 10 of constant outer diameter are two grooves, each of which accommodates a respective resilient sealing ring 11, for example, O-rings.

The annular member 7, the sleeve 4 and the end-walls 5 and 6 are preferably made of a material of low heat conductivity, for instance stainless steel. It is particularly important that the end-wall 5 and the sleeve 4 have a low heat-conducting capacity. The sealing rings 11, that is the illustrated O-rings, may consist of material sold under the designations Buna-N or Viton, or some other suitable material that can be exposed to temperatures as low as $-40°$ C.

Figure 2:
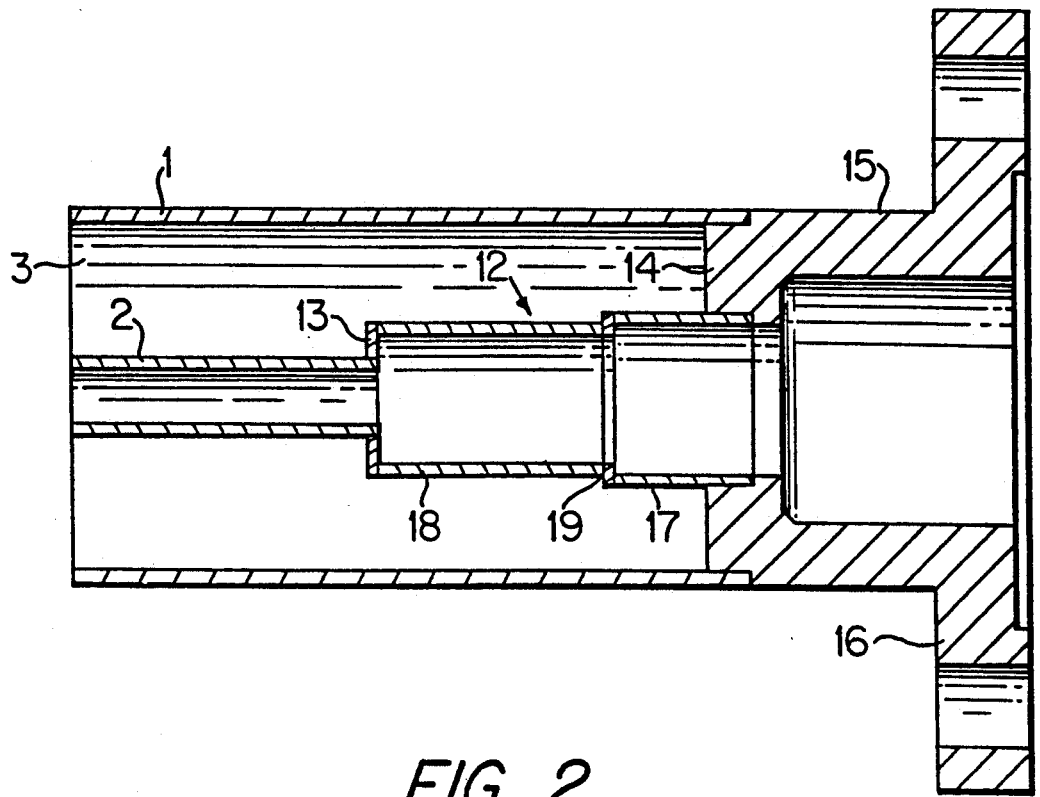
FIG. 2 is a sectional view of an inventive second coupling of a vacuum line.

FIG. 2 illustrates a second coupling part which is intended for connection with the male part illustrated in FIG. 1, this second coupling part being hereinafter called the female part. The components of the vacuum line in FIG. 2 have been given the same reference numerals as those used in FIG. 1.

In the case of the illustrated female part, the inner pipe 2 is shorter than the outer pipe 1 and a second sleeve-like member 12 having a larger inner diameter than the outer diameter of the pipe 2 extends concentrically with the pipe 2, from the end of the pipe to the end of the outer pipe 1. The rear end of the sleeve 12 is connected to the inner pipe 2 by means of a third end-wall 13, in a manner to obtain a vacuum seal. The front end of the sleeve 12 is connected to the outer pipe 1 by means of a fourth end-wall 14 in a manner to obtain a vacuum seal. A second member 15 of annular cross-section extends from the end-wall 14 in a direction away from the third end-wall 13, the second annular member 15 having a larger inner diameter than the sleeve 12 and merging at its front end with a connecting flange 16.

In the case of the illustrated embodiment, the front part 17 of the sleeve 12 has a larger diameter than the rear part 18, such that the wall 19 which connects the parts 17 and 18 forms an engagement shoulder, the function of which will be described hereinafter The wall 19 may optionally extend somewhat into the sleeve 12. Alternatively, the sleeve 12 may have a constant outer diameter and an engagement shoulder formed at the junction between the fourth end-wall 14 and the sleeve 12. This shoulder may also extend somewhat into the sleeve 12, if desired.

The annular member 15 with associated flange 16 is preferably made of stainless steel and has a relatively large mass and a large exposure surface to the atmosphere surrounding the coupling.

Figure 3:
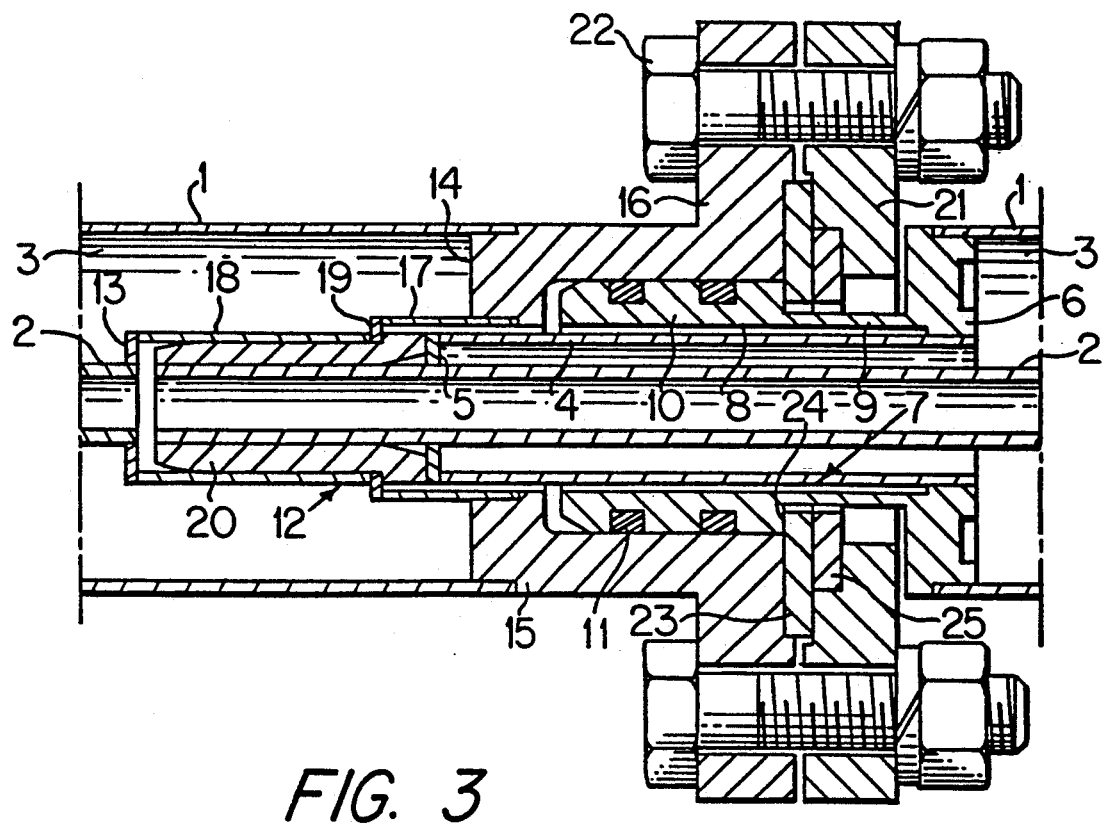
FIG. 3 illustrates an inventive coupling device which includes, the coupling parts shown in FIGS. 1 and 2.

FIG. 3 illustrates the male and female parts shown in FIGS. 1 and 2 respectively in a mutually coupled state, the same reference numerals being used as those in the earlier Figures.

It will be seen from FIG. 3 that the diameter of the front part of the first annular member 7 is so adapted that when coupling the male and female parts together, this part is received with a small clearance in the hollow of the second annular member 15 of the female part. The sealing rings 11 will therewith form an effective seal between the mutually opposing surfaces of the annular members 7 and 15.

Arranged between the sleeve 12 of the female part and the inner pipe 2 of the male part is a guiding and bearing sleeve 20, which is made of a low-friction material capable of withstanding low and/or high temperatures, suitably polytetrafluoroethylene, referred to in the following and in the Claims as PTFE. The shoulder formed by the connecting wall 19 between the sleeve 12 and the parts 17 and 18 coacts with a corresponding shoulder formed on the outer surface of the bearing sleeve 20.

In order to ensure that the male and female parts of the coupling are held positively connected subsequent to being coupled together, the inventive coupling device also includes a loose flange 21. In the case the embodiment shown in FIG. 3, the inner diameter of the flange 21 is greater than the outer diameter of the front part 10, so as to enable the loose flange 21 to be fitted around the back part 9 of the first annular member 7. A two-piece or openable ring-shaped washer 25 made from, for instance, stainless steel and having an inner diameter which is smaller than the outer diameter of the front part 10 of the first annular member 7 is located in front of the flange 21. The flange 21 is drawn together with the end flange 16 of the female part with the aid of bolts 22 or similar devices. In order to avoid metallic contact, particularly between the first annular member 7 and the washer 25, a two-piece plate of low-friction material, suitably PTFE, is located between the flange 21 and the washer 25 and the member 7 and the flange 16, respectively.

Thus, when tightening the flange connection the male and female parts will be urged towards each other and held fixed in a compressed state by forces transmitted from the flange 21 to the male coupling part, via the washer 25, the plate 23 and the engagement shoulders 24, at the same time as one end of the guiding and bearing sleeve 20 coacts with the first end-wall 6 and the shoulder formed by the wall 19 coacts with a corresponding shoulder on the outer surface of the sleeve 20.

Figure 4:
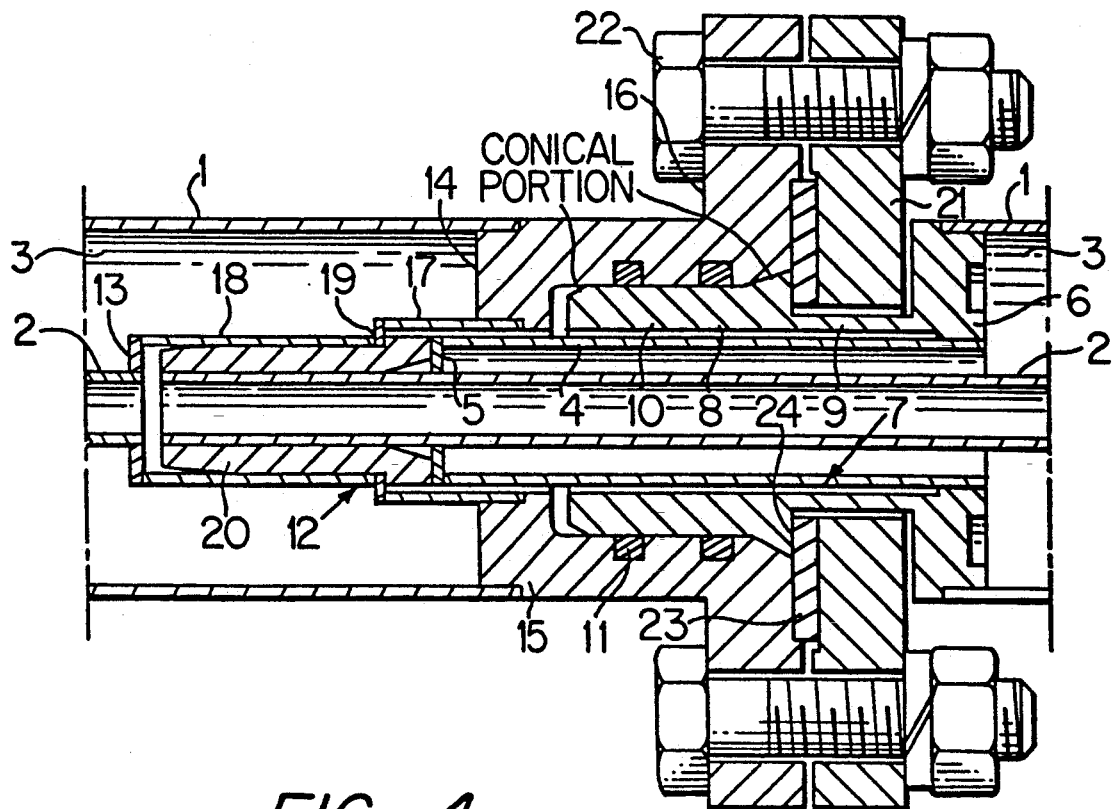
FIG. 4 illustrates an inventive coupling device which includes a slightly modified version of the inventive coupling parts.

FIG. 4 illustrates an alternative embodiment of an inventive device, wherewith the same reference numerals have been used as those used in FIG. 3. In the case of the embodiment shown in FIG. 4, the sealing rings 11 have been located in the second annular member 15 of the female part, which therefore presents a part of constant inner diameter which is located opposite a corresponding part of the front part 10 of constant outer diameter of the first annular member 7. In other respects, these components may present conically configured parts, if desired. Such conical parts may also be included in the embodiment of FIG. 3.

The washer 25 of the FIG. 3 is omitted in the embodiment shown in FIG. 4, in which the flange 21 is a two-part or openable flange and has an inner diameter which is smaller than the diameter of the front part 10 of the first annular member 7.

Those components of the inventive coupling which are liable to wear when the two connected vacuum lines are rotated relative to one another are the sealing rings 11, the bearing sleeve 20 and the plate 23, these components being readily replaceable at low costs. In order to improve the seal and to reduce the friction on the sealing rings 11, the rings are preferably lubricated with a substance which will withstand low or high temperatures, for instance silicone grease.

The most sensitive components of the coupling device, the sealing rings are so located as not to be exposed to extreme temperatures, even when very cold or very hot media are transported in the inner pipe 2. The thermal transmission path through metal between the inner pipe 2 and the sealing rings 11 is long and continues over a long path of thin material, preferably material of poor thermal conductivity. This path thus includes the first end-wall 5, the thin-wall sleeve 4, the end-wall 6, the back part 9 of small diameter on the first annular member 7 and the front part 10 of the member. The labyrinth like path exhibits high resistance to thermal transports, and hence the sealing rings 11 are exposed only to a moderately low temperature, even when the pipe 2 transports liquid nitrogen.

Even though the bearing sleeve 20 forms a good seal with the sleeve 12, when the line comprising the mutually coupled line sections is used, for instance, to transport liquid nitrogen, a small quantity of nitrogen may possibly penetrate into the closed cavities or hollows formed between the sleeve 4 and the members 14 and 15, and 7 respectively. As described above, these cavities are closed, that is the sealing rings 11 cut-off the connection to ambient surroundings, and hence no medium is able to flow from the inner pipe 2 to the surroundings. Any liquid nitrogen which penetrates into these cavities will be vaporized and heated as a result, among others, of contact with the second annular member 15 of relatively large mass and relatively large heat-absorbing surface area, and will therewith be present in a gaseous state in the cavities In order to minimize the quantity of coolant capable of penetrating into the cavities, the volumes of these cavities shall be as small as possible. Experiments carried out with a coupling constructed in accordance with the present invention have shown that when transporting liquid nitrogen (−196° C.) along the inner pipe 2, the temperature of vaporized nitrogen resides in the vicinity of the sealing rings 11 is only about −6° C. Since the sealing rings shall be capable of withstanding temperatures up to −40° C., there is thus a comfortable safety margin.

A coupling of the above kind can be used within many different fields, is very compact, has a long useful life span and worn components can be readily replaced.

It will be understood that the inventive coupling device is not restricted to use for coupling together vacuum lines which, when coupled, shall be rotatable relative to each other. For instance, the inventive male or female coupling parts may be incorporated in a fluid receiving apparatus which is intended to rotate relative to a vacuum line. A corresponding male or female part respectively can be coupled to the receiving apparatus. The male or female coupling part present in the receiving apparatus must be configured so that the sealing rings will not be exposed to extremely high or low temperatures when coupling to the vacuum pipe.

We claim

1. A coupling device comprising a first and a second coupling part intended for coupling together two vacuum lines such that, when coupled, said lines can be rotated relative to each other, said vacuum lines including two mutually concentrical pipes which form a vacuum space therebetween, wherein the inner pipe at the first coupling part is longer than the outer pipe and wherein the inner pipe at the second coupling part is shorter than the outer pipe, wherein the first coupling part includes a first sleeve-like member which is concentrical with the inner and outer pipes and has a larger inner diameter than the inner pipe and a smaller outer diameter than the outer pipe, said first sleeve-like member being provided at its front end with a ring-shaped first end-wall which is connected to the outer surface of the inner pipe to form a vacuum seal between the ends of the two pipes in an axial direction, and is provided at its rear end with a second ring-shaped end-wall which is connected to the outer pipe to obtain a vacuum seal;

wherein a first member of annular cross-section extends from the second end-wall in a direction towards the first end-wall, said first member having a front part which is spaced from the second end-wall, said front part having at least a portion of constant outer diameter of the first sleeve-like member;

wherein the second coupling part includes a second sleeve-like member of larger inner diameter than that of the inner pipe and of smaller outer diameter than that of the outer pipe, the rear end of said second sleeve-like member being connected to the outer surface of the inner pipe by a third end-wall to obtain a vacuum seal, and the front end of said second sleeve-like member being connected to the outer pipe by a fourth ring-shaped end-wall to obtain a vacuum seal; and wherein a second member of annular cross-section extends from the fourth end-wall in a direction away from the third end-wall, said second member of annular cross-section having an inner diameter which is larger than the diameter of the sleeve-like second member and which is constant over at least a part of the length of said second member and merges at its front end with a flange;

wherein at least one of said constant outer diameter portion of said front part of the first annular member of the first coupling part and the part of constant inner diameter of the second annular member of the second coupling part, has formed therein at least one circular groove which accommodates a sealing ring; and wherein the outer diameter of said portion of the front part of the first coupling part is smaller than the inner diameter of the second member of annular cross-section of said second coupling part, so that when said coupling parts are coupled together said portion of the front part of the first annular member is received with a small clearance in the second annular member and the sealing ring forms a seal between said coupling parts.

2. A device according to claim 1, wherein said device includes a sleeve-like guide which is so arranged that when the two coupling parts are coupled together said guide is located between the outwardly projecting part of the inner pipe of the first coupling part and the second sleeve-like member of the second coupling part.

3. A device according to claim 2, wherein one end of the guide sleeve is intended to abut the ring-shaped end-wall of the first coupling part; and wherein a shoulder part of the fourth end-wall or the second sleeve-like member of the second coupling part coact with a corresponding shoulder part on the peripheral surface of the guide sleeve.

4. A device according to claim 2, wherein the sleeve-like guide is made of a low friction material capable of withstanding low and high temperatures.

5. A device according to claim 1, wherein said device includes a ring-shaped connecting flange which encircles a rear part of the first annular-section member of the first coupling part, said rear part having a smaller outer diameter than that of the front part of said annular member; and wherein said flange is intended to connect the front end flange of the annular second member when coupling said coupling parts together, so as to securely hold the coupling parts in their coupled state.

6. A device according to claim 5, wherein a ring-shaped plate of low friction material, is located between the connecting flanges.

7. A device according to claim 5 wherein the inner diameter of the connecting flange is smaller than the largest outer diameter of the first annular member, and wherein said connecting flange is a two-piece or openable flange.

8. A device according to claim 6, wherein the inner diameter of the connecting flange is larger than the outer diameter of the front part of the first annular member; and wherein a two-part or openable ring-shaped plate is located between the connecting flange and the ring-shaped plate, the inner diameter of the openable ring-shaped plate being smaller than the outer diameter of the front part of the first annular member.

9. A device according to claim 1, wherein at least one end of said portion of constant outer diameter merges with a conical portion of said front part.

10. A device according to claim 1, wherein the end of the first annular member facing towards the second end-wall merges with a rear portion whose outer diameter is smaller than the front part.

11. A device according to claim 10, wherein said first coupling part has engagement shoulders located in the junction between said front and rear parts, said shoulders extending substantially perpendicularly to the longitudinal axis of the pipes.

12. A device according to claim 1, wherein the first annular member defines a gap between itself and the first sleeve-shaped member, said gap extending from said second end-wall and terminating at the front end of said first annular member.

13. A device according to claim 1, wherein the first sleeve-shaped member has a low heat conducting capacity.

14. A device according to claim 1, wherein the first sleeve-shaped member is made of a material of low thermal conductivity.

15. A device according to claim 1, wherein said part of constant inner diameter of said second annular member merges with a conical part at least at its one end.

16. A device according to claim 1, wherein the second sleeve-shaped member has an inner diameter which is smaller than the fourth end-wall, such that the junction of the fourth end-wall with the second sleeve-shaped element extends perpendicularly to the axial direction of the pipes and therewith forms an engagement shoulder which preferably extends slightly beyond the inner surface of the sleeve-shaped member.

17. A device according to claim 1, wherein the front part of the second sleeve-shaped member has a larger constant diameter than the rear part, wherein the junction of the large diameter with the smaller diameter is formed by a ring-shaped wall whose inner diameter is preferably equal to or larger than the inner diameter of the rear part of said second sleeve-shaped member.

18. A device according to claim 1, wherein the second sleeve-shaped member has a low heat-conducting capacity.

19. A device according to claim 1, wherein the second sleeve-shaped member is made of a material of low heat conductivity.

20. A device according to claim 1, wherein said first sleeve-shaped member and said second sleeve-shaped member are made of stainless steel.

* * * * *